United States Patent
Jeon (10) Patent No.: US 11,745,622 B2
(45) Date of Patent: Sep. 5, 2023

(54) DEVICE FOR CONTROLLING TEMPERATURE OF BATTERY IN VEHICLE AND METHOD FOR OPERATING THE SAME

(71) Applicants: Hyundai Motor Company, Seoul (KR); Kia Corporation, Seoul (KR)

(72) Inventor: Ki Nam Jeon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 226 days.

(21) Appl. No.: 17/468,916

(22) Filed: Sep. 8, 2021

(65) Prior Publication Data

US 2022/0289072 A1    Sep. 15, 2022

(30) Foreign Application Priority Data

Mar. 11, 2021 (KR) .................. 10-2021-0032226

(51) Int. Cl.
*B60L 58/26* (2019.01)
*B60L 53/62* (2019.01)
(Continued)

(52) U.S. Cl.
CPC ............... *B60L 58/26* (2019.02); *B60L 53/62* (2019.02); *B60L 58/12* (2019.02); *B60L 58/27* (2019.02); *H01M 10/44* (2013.01); *H01M 10/486* (2013.01); *H01M 10/613* (2015.04); *H01M 10/615* (2015.04); *H01M 10/625* (2015.04); *H01M 10/633* (2015.04); *B60K 6/28* (2013.01); *B60L 2240/545* (2013.01); *B60L 2240/66* (2013.01); *B60L 2240/68* (2013.01); *B60L 2240/80* (2013.01); *B60Y 2200/91* (2013.01); *B60Y 2200/92* (2013.01); *B60Y 2300/91* (2013.01); *B60Y 2306/05* (2013.01); *H01M 2220/20* (2013.01)

(58) Field of Classification Search
CPC .......... B60L 58/26; B60L 53/62; B60L 58/12; B60L 58/27; B60L 2240/545; B60L 2240/66; B60L 2240/68; B60L 2240/80; H01M 10/44; H01M 10/486; H01M 10/613; H01M 10/615; H01M 10/625; H01M 10/633; B60K 6/28
See application file for complete search history.

(56) References Cited

U.S. PATENT DOCUMENTS 9,522,607 B2 * 12/2016 Kim .................. B60L 53/62
9,997,816 B2 *  6/2018 Son .................. B60R 16/033
(Continued)

FOREIGN PATENT DOCUMENTS

| CN | 113103923 A | * | 7/2021 | .............. B60L 50/60 |
| DE | 102020107352 A1 | * | 10/2020 | ............. B60H 1/143 |
| JP | 6634453 B2 | * | 1/2020 | .......... B60L 11/1875 |

*Primary Examiner* — Len Tran
*Assistant Examiner* — Gustavo A Hincapie Serna
(74) *Attorney, Agent, or Firm* — Fox Rothschild LLP (57) ABSTRACT

A device for controlling a battery for a vehicle is provided to maintain a battery temperature representing the optimal charging efficiency when the battery reaches a charging time point. The device determines the charging time point of a battery used in a hybrid vehicle and an electric vehicle, and adjusts the battery temperature based on a status of charge (SoC) of the battery at the determined charging time point.

19 Claims, 5 Drawing Sheets

(51) Int. Cl.
*B60L 58/27* (2019.01)
*H01M 10/613* (2014.01)
*H01M 10/615* (2014.01)
*H01M 10/625* (2014.01)
*H01M 10/633* (2014.01)
*H01M 10/44* (2006.01)
*H01M 10/48* (2006.01)
*B60L 58/12* (2019.01)
*B60K 6/28* (2007.10)

(56) References Cited

U.S. PATENT DOCUMENTS

| | | | |
|---|---|---|---|
| 10,020,534 B2* | 7/2018 | DeKeuster | B60L 50/66 |
| 10,427,520 B2* | 10/2019 | Dalum | B60K 17/28 |
| 10,486,542 B2* | 11/2019 | Wang | B60L 3/0046 |
| 10,611,262 B2* | 4/2020 | Erb | B60L 58/13 |
| 10,792,993 B2* | 10/2020 | Dalum | B60K 6/42 |
| 11,225,240 B2* | 1/2022 | Dalum | B60K 25/02 |
| 11,584,242 B2* | 2/2023 | Dalum | B60L 58/22 |
| 11,584,255 B2* | 2/2023 | Jin | H01M 10/46 |
| 2014/0132214 A1* | 5/2014 | Katanoda | B60L 58/15 |
| | | | 320/109 |
| 2021/0126292 A1* | 4/2021 | Ogaki | H01M 10/615 |
| 2021/0218073 A1* | 7/2021 | Duan | B60L 53/66 |

* cited by examiner

| CHARGING TEMPERATURE(°C) \ SOC OF BATTERY(%) | 0 | 5 | 10 | 15 | 20 | 25 | 30 | 35 | 40 | 45 | 50 | 55 | 60 | 65 | 100 |
|---|---|---|---|---|---|---|---|---|---|---|---|---|---|---|---|
| -35 | 16 | 12 | 12 | 10 | 10 | 8 | 6 | 5.2 | 4 | 3.6 | 2.4 | 2 | 1.6 | 1.2 | 0 |
| -30 | 20 | 20 | 16 | 12 | 12 | 10 | 8 | 7.2 | 6 | 4.8 | 4 | 3.2 | 2.4 | 2 | 0 |
| -25 | 32 | 28 | 24 | 20 | 16 | 16 | 12 | 10 | 8 | 6.8 | 5.6 | 4.8 | 4 | 3.6 | 0 |
| -20 | 52 | 44 | 40 | 32 | 28 | 24 | 20 | 14 | 15.2 | 12 | 11.2 | 10 | 9.6 | 8 | 0 |
| -15 | 68 | 60 | 52 | 44 | 40 | 36 | 30 | 26 | 24 | 20 | 16 | 14.8 | 13.2 | 12 | 0 |
| -10 | 84 | 76 | 68 | 60 | 56 | 48 | 44 | 36 | 20 | 28 | 24 | 20 | 18 | 16.8 | 0 |
| -5 | 108 | 100 | 92 | 76 | 68 | 64 | 60 | 52 | 48 | 40 | 36 | 32 | 28 | 26 | 0 |
| 0 | 140 | 120 | 108 | 100 | 92 | 88 | 80 | 72 | 64 | 56 | 52 | 44 | 38 | 36 | 0 |
| 5 | 160 | 148 | 140 | 132 | 124 | 116 | 104 | 94 | 84 | 78 | 72 | 64 | 58 | 52 | 0 |
| 10 | 180 | 168 | 160 | 152 | 140 | 128 | 122 | 120 | 108 | 100 | 92 | 84 | 76 | 68 | 0 |
| 15 | 180 | 180 | 168 | 160 | 156 | 144 | 136 | 132 | 124 | 120 | 112 | 104 | 96 | 84 | 0 |
| 20 | 180 | 180 | 180 | 172 | 168 | 164 | 152 | 148 | 144 | 136 | 128 | 124 | 116 | 104 | 0 |
| 25 | 180 | 180 | 180 | 180 | 180 | 180 | 170 | 164 | 160 | 152 | 146 | 140 | 136 | 124 | 0 |
| 30 | 180 | 180 | 180 | 180 | 180 | 180 | 180 | 180 | 176 | 168 | 164 | 160 | 156 | 148 | 0 |
| 35 | 180 | 180 | 180 | 180 | 180 | 180 | 180 | 180 | 180 | 180 | 178 | 176 | 172 | 158 | 0 |
| 40 | 180 | 180 | 180 | 180 | 180 | 180 | 180 | 180 | 180 | 180 | 180 | 180 | 180 | 180 | 0 |
| 45 | 180 | 180 | 180 | 180 | 180 | 180 | 180 | 180 | 180 | 180 | 180 | 176 | 180 | 180 | 0 |
| 50 | 180 | 180 | 180 | 180 | 180 | 180 | 180 | 180 | 180 | 180 | 180 | 180 | 180 | 180 | 0 |
| 55 | 180 | 180 | 180 | 180 | 180 | 180 | 180 | 180 | 180 | 180 | 180 | 180 | 180 | 180 | 0 |

CHARGING EFFICIENCY(Kw)

DEVICE FOR CONTROLLING TEMPERATURE OF BATTERY IN VEHICLE AND METHOD FOR OPERATING THE SAME

CROSS-REFERENCE TO RELATED APPLICATION

This application claims the benefit of priority to Korean Patent Application No. 10-2021-0032226, filed on Mar. 11, 2021, the entire contents of which are incorporated herein by reference.

TECHNICAL FIELD

The present disclosure relates to a method for controlling a battery to have the optimal temperature, and more particularly to an apparatus and a method for controlling the temperature of a battery in a vehicle, capable of improving charging efficiency of the battery by controlling the battery to have the optimal temperature, when charging the battery in the vehicle.

BACKGROUND

A hybrid vehicle or an electric vehicle may reduce exhaust gas and improve fuel efficiency due to using a motor as a driving source. The hybrid vehicle may be a vehicle of using an internal combustion engine and a motor, and the electric vehicle may be a vehicle having a battery cell, which is charged with power or discharged, and a motor.

The hybrid vehicle and the electric vehicle may perform driving and regeneration braking by using the motor, and the motor may generate power using the output voltage of a battery. Batteries of the hybrid vehicle and the electric vehicle may undergo operations of charging and discharging electrical energy, based on the electrochemical reaction. Accordingly, the charging efficiency and the discharging efficiency of a vehicle battery depend on a battery temperature which may smoothly make the electrochemical reaction.

The battery may undergo the operation of discharging the electrical energy to operate parts, and of charging the electrical energy by regeneration braking, during the driving, and the battery temperature may be changed due to energy loss caused during the charging operation and the discharging operation. Accordingly, a battery temperature management device may maintain the battery temperature within an appropriate range. The battery temperature management device, which adjusts the battery temperature through heat exchange between a coolant and the battery, may include a device such as a fan, a radiator, a chiller, a pump, and a heater.

However, conventionally, the battery temperature management device fails to maintain the battery temperature to the optimal charging temperature when the battery is charged, since the battery temperature management device manages the battery temperature without variation during driving. In addition, since the conventional battery temperature management device may unnecessarily consume power, by maintaining the battery temperature regardless of the optimal charging temperature of the battery.

SUMMARY

The present disclosure has been made to solve the above-mentioned problems occurring in the prior art while advantages achieved by the prior art are maintained intact. An aspect of the present disclosure provides a device for controlling a battery for a vehicle and a method for operating the same, capable of maintaining a battery temperature representing the optimal charging efficiency when the battery reaches a charging time point, by determining the charging time point of a battery used in a hybrid vehicle and an electric vehicle, and adjusting the battery temperature based on a status or state of charge (SoC) of the battery at the determined charging time point.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling a battery for a vehicle may include a first time point determining device configured to determine a first time point to start charging of the battery, based on driving pattern information of the vehicle and driving environment information of the vehicle, a consumption pattern determining device configured to determine a power consumption pattern of the battery until the first time point, and a status of charge (SoC) at the first time point, based on the driving pattern information, the driving environment information, and a current SoC of the battery, a target temperature determining device configured to determine a target battery temperature at the first time point, based on the SoC of the battery and a charging temperature map for the battery, a temperature change pattern determining device configured to determine a temperature change pattern of the battery until the first time point, based on the power consumption pattern and a current temperature of the battery, a second time point determining device configured to determine a second time point to start temperature control over the battery, based on the temperature change pattern and the target battery temperature, and a temperature controller configured to adjust a temperature of the battery after the second time point.

In addition, according to an exemplary embodiment, the target battery temperature may be a temperature which represents battery charging efficiency of a threshold level or more. In addition, according to an exemplary embodiment, the target temperature determining device may be configured to match the SoC of the battery, a charging temperature of the battery, and the charging efficiency to each other and store the matching result in a form of the charging temperature map. The temperature controller may be configured to decrease the temperature of the battery, when the current temperature of the battery is greater than the target battery temperature.

The temperature controller may be configured to increase the temperature of the battery, when the current temperature of the battery is less than the target battery temperature. In addition, the temperature controller may be configured to determine whether a current time point reaches the first time point, when the current temperature of the battery is within a preset range from the target battery temperature, and additionally perform the temperature control over the battery based on the determination result.

The device for controlling the battery for the vehicle may include a driving record collecting device configured to generate the driving pattern information based on a driving record of the vehicle, and the driving record may include at least one of information on driving power of the vehicle, regenerative power of the vehicle, speed information of the vehicle, or operating information of a controller of the vehicle. In addition, the driving environment information may include at least one of traffic information, information on a driving path, an external weather condition, or information on a position of a charging station.

According to an embodiment, the second time point determining device may be configured to determine the second time point by reflecting performance of the temperature controller to increase the temperature or to decrease the temperature. In addition, the vehicle may be a vehicle operated to repeatedly drive in a preset section.

According to another aspect of the present disclosure, a method for operating a battery for a vehicle may include determining, by a first time point determining device, a first time point to start charging of the battery, based on driving pattern information of the vehicle and driving environment information of the vehicle, determining, by a consumption pattern determining device, a power consumption pattern of the battery until the first time point, and a status of charge (SoC) at the first time point, based on the driving pattern information, the driving environment information, and a current SoC of the battery, determining, by a target temperature determining device, a target battery temperature at the first time point, based on the SoC of the battery and a charging temperature map for the battery, determining, by a temperature change pattern determining device, a temperature change pattern of the battery until the first time point, based on the power consumption pattern and a current temperature of the battery, determining, by a second time point determining device, a second time point to start temperature control over the battery, based on the temperature change pattern and the target battery temperature, and adjusting, by a temperature controller, a temperature of the battery after the second time point.

In addition, according to another embodiment, the target battery temperature may be a temperature which represents battery charging efficiency of a threshold level or more. The charging temperature map may have a result obtained by matching the SoC of the battery, a charging temperature of the battery, and the battery charging efficiency to each other. The adjusting of the temperature of the battery may include decreasing, by the temperature controller, the temperature of the battery, when the current temperature of the battery is greater than the target battery temperature.

In addition, the adjusting of the temperature of the battery may include increasing, by the temperature controller, the temperature of the battery, when the current temperature of the battery is less than the target battery temperature. The adjusting of the temperature of the battery may also include determining, by the temperature controller, whether a current time point reaches the first time point, when the current temperature of the battery is within a preset range from the target battery temperature, and additionally performing the temperature control over the battery based on the determination result.

The method for operating the device for controlling the battery for the vehicle may further include collecting, by a driving record collecting device, the driving pattern information based on a driving record of the vehicle. The driving record may include at least one of information on driving power of the vehicle, regenerative power of the vehicle, speed information of the vehicle, or operating information of a controller of the vehicle.

In addition, the driving environment information may include at least one of traffic information, information on a driving path, an external weather condition, or information on a position of a charging station. The determining of the second time point may include determining, by the second time point determining device, the second time point by reflecting performance of the temperature controller to increase the temperature or to decrease the temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in more detail with reference to the accompanying drawings. The following exemplary embodiments are provided only for allowing those skilled in the art to apparently understand the spirit of the present disclosure, and the present disclosure is not limited to embodiments described in the present disclosure. Other variations of the present disclosure can be embodied. Some components in the accompanying drawings may be exaggerated, omitted or schematically drawn for the purpose of convenience or clarity. In addition, the size of each component does not utterly reflect an actual size.

Further, in adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
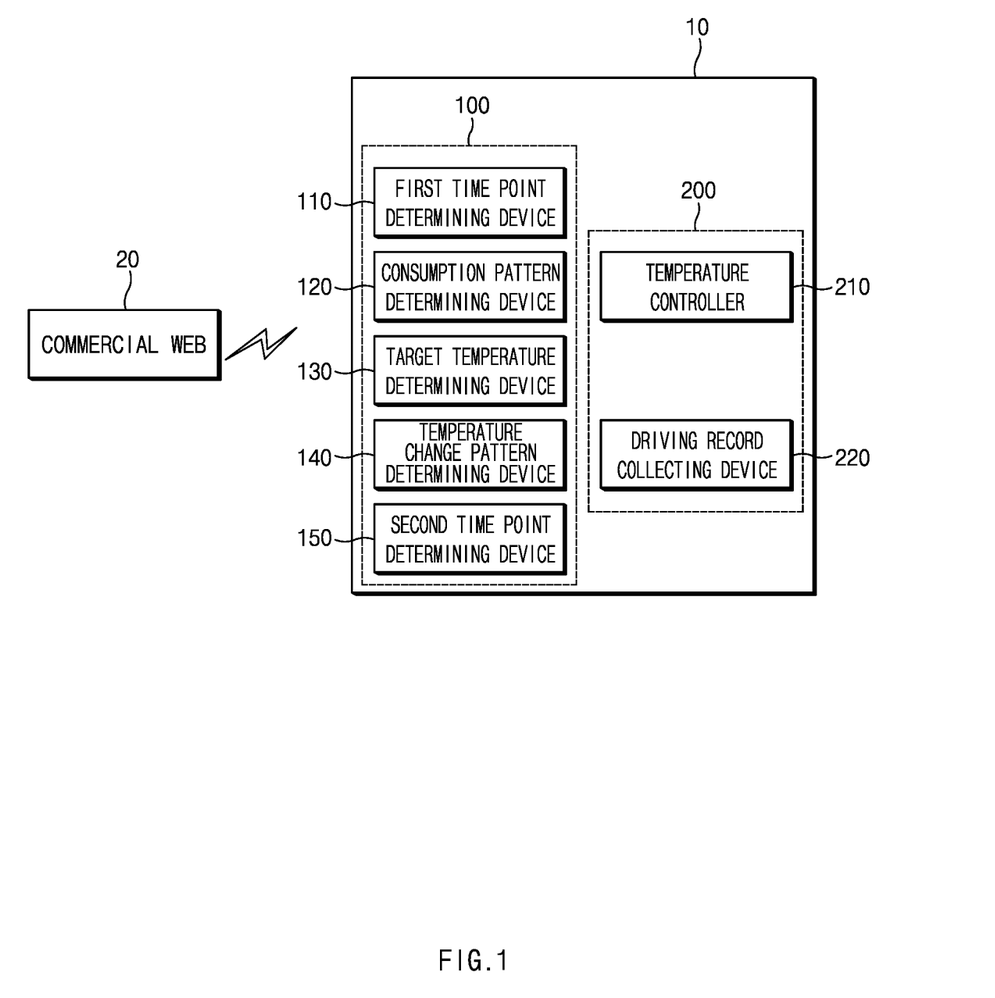
FIG. 1 illustrates a device for controlling a battery for a vehicle and a commercial web, according to an exemplary embodiment of the present disclosure.

FIG. 1 illustrates a device for controlling a battery for a vehicle and a commercial web 20, according to an exemplary embodiment of the present disclosure. As illustrated in FIG. 1, the device 10 for controlling a battery for a vehicle may communicate with the commercial web 20. The device 10 for controlling the battery for the vehicle may include a first section 100 and a second section 200.

The commercial web 20 may be a commercial communication network or a non-commercial communication network connected with the device 10 for controlling the battery for the vehicle, and may include, for example, the Internet, an intranet, or a local communication network. The commercial web 20 may be configured to transmit information (e.g., driving environment information) on a driving environment of the vehicle to the device 10 for controlling the battery for the vehicle. The driving environment information of the vehicle may include public data, and the public data may include traffic information, a slope gradient of a driving path of the vehicle, information of a corner of the driving path of the vehicle, or information on an external weather condition.

The first section 100 may include a first time point determining device 110, configured to determine a first time point to start the charging of the battery, based on information (driving pattern information) on a driving pattern of the vehicle and the driving environment information of the vehicle, a consumption pattern determining device 120, configured to determine a power consumption pattern of the battery until the first time point, and a status of charge (SoC) at the first time point, based on the driving pattern information of the vehicle, the driving environment information, and a current status of charge (SoC) of the battery, a target temperature determining device 130, configured to determine a target temperature (target battery temperature) of the battery at the first time point, based on the SoC of the battery and a charging temperature map for the battery, a temperature change pattern determining device 140, configured to determine a pattern (temperature change pattern) in which the temperature of the battery is changed, of the battery until the first time point, based on the power consumption pattern and a current temperature of the battery, and a second time point determining device 150 configured to determine a second time point to start controlling (e.g., the temperature control over the battery) the temperature of the battery based on the temperature change pattern and the target battery temperature.

The components included in the first section 100 may include a processor (not illustrated) and a memory (not illustrated). The processor (not illustrated) may be configured to operate the various components. In addition, the memory (not illustrated) may be configured to store data for operating the components.

The processor (not illustrated) and the memory (not illustrated) are individually included in each of the components (for example, the first time point determining device 110, the consumption pattern determining device 120, the target temperature determining device 130, the temperature change pattern determining device 140, and the second time point determining device 150). In addition, according to another exemplary embodiment, the processor (not illustrated) and the memory (not illustrated) may be included in the first section 100 to control each component of the first section 100 and to store data for each component of the first section.

According to an exemplary embodiment, the first section 100 may be provided in a telematics server. The telematics server may refer to a server which provides information to a vehicle using information on the position of the vehicle and a wireless communication network. The telematics server may be wirelessly connected with an external communication network, such as the commercial web 20, which is illustrated, and may provide additional services to the vehicle based on information received from the external communication network.

According to an exemplary embodiment of the present disclosure, the first section 100 may be configured to receive the driving environment information of the vehicle from the commercial web 20 and receive the driving pattern information of the vehicle from the second section 200. The first section 100 may be configured to determine the charging time point of the battery and the SoC of the battery at the charging time point, based on the received driving environment information and the driving pattern information of the vehicle. The first section 100 may be configured to manage the temperature of the vehicle battery based on the determination result. According to another exemplary embodiment, the first section 100 may be provided in the vehicle together with the second section 200.

The first time point determining device 110 may be configured to determine the first time point to start the charging of the battery in the vehicle, based on the driving pattern information of the vehicle and the driving environment information of the vehicle. The driving pattern information of the vehicle may be information generated based on a driving record of the vehicle. For example, when the vehicle is a commercial vehicle, the commercial vehicle may repeatedly travel along a specific path, and may make a driving record pattern by detecting a common pattern from driving records. The driving record may be a record of data collected by the vehicle until a time point in which the vehicle is turned off from a time point at which the vehicle is turned on. A driving record collecting device 220 may provide the driving record pattern serving as the driving pattern information, to the first section 100.

The driving pattern information may be vaned based on the status of the vehicle, a driving tendency, and a driving time of the vehicle. For example, a vehicle driving during a time of heavy traffic has a driving pattern in which deceleration and acceleration are frequently executed. The driving pattern information may include the use pattern of driving power by the vehicle, a pattern of charging regenerative power of the vehicle, an acceleration/deceleration pattern of the vehicle, a speed pattern of the vehicle, and a use pattern of the controller by the vehicle.

In addition, the driving environment information of the vehicle includes traffic information, information on a driving path of the vehicle, information on an external whether at a place in which the vehicle is driving, information on a charging station positioned on the driving path of the vehicle, information on the slope gradient of the driving path of the vehicle, or an angle of a corner of the driving path. When the vehicle is a commercial vehicle (for example, a bus) repeatedly driving a preset section, the driving pattern information of the vehicle may include information on a stop, information on a passenger, and information on a driving section of the commercial vehicle.

For example, the first time point determining device 110 may be configured to acquire information on the position of the charging station of the battery, from the driving pattern information of the vehicle. The first time point determining device 110 may be configured to determine the first time point, in which the vehicle arrives at the charging station and starts charging the battery, based on the information on the position of the charging station and the driving pattern of the vehicle. For example, the first time point determining device 110 may be configured to determine, as the first time point, a time point expected for the vehicle to arrive at a charging station closest to a current position of the vehicle on the driving path of the vehicle, based on the position of the charging station.

The consumption pattern determining device 120 may be configured to determine a power consumption pattern of the battery until the first time point and a SoC of the battery at the first time point, based on the driving pattern information of the vehicle, the driving environment information of the vehicle, and the current SoC of the battery. In the driving of the vehicle, the power consumption (battery power consumption) of the battery may be varied based on the acceleration/deceleration pattern of the vehicle, the use pattern of the controller included in the vehicle, the use pattern of the driving power, and the regenerative power charging pattern.

For example, the vehicle having a driving pattern in which deceleration and acceleration are frequently repeated, has larger power consumption, when compared to a vehicle having a driving pattern in which deceleration and acceleration are less repeated. In addition, the battery power consumption during the driving may be varied based on the driving path of the vehicle, and the traffic amount of the driving path of the vehicle. For example, when a slop is present on the driving path of the vehicle, the battery power consumption of the vehicle may become greater than that on a path having no slop. Accordingly, the consumption pattern determining device 120 may be configured to determine the battery power consumption, based on the driving pattern of the vehicle and the driving section of the vehicle, and determine a power consumption pattern of the battery, based on the battery power consumption corresponding to the driving record.

In addition, the consumption pattern determining device 120 may be configured to determine the SoC of the battery at the first time point, based on the power consumption pattern of the battery and the current SoC of the battery. For example, the SoC of the battery at the first time point may be a value obtained by subtracting the battery power, which is consumed until the first time point, from the current SoC of the battery.

The target temperature determining device 130 may be configured to determine the target battery temperature at the first time point, based on the SoC of the battery at the first time point and the charging temperature map for the battery. The charging temperature map may be a table in which a SoC of the battery, a charging temperature of the battery, and the charging efficiency of the battery are matched to each other. The charging temperature and the charging efficiency of the battery based on the SoC of the battery may be experimentally determined with respect to each type of a battery used in the vehicle. The target temperature determining device 130 may be configured to store the charging temperature map in the memory (not illustrated).

The target temperature determining device 130 may be configured to determine the target battery temperature having the optimal charging efficiency, based on the charging temperature of the battery and the charging efficiency of the battery matched to the SoC of the battery at the first time point. The target battery temperature may refer to a temperature, which represents charging efficiency of a threshold level or more, of charging temperatures of the battery matched to the SoC of the battery at the first time point. As the temperature of the battery is maintained to the temperature representing the charging efficiency of the threshold level or more, the battery may be charged with power within the minimum time.

According to another exemplary embodiment, the target temperature determining device 130 may be configured to determine, as the target battery temperature, a battery temperature, which represents the least temperature difference from a battery temperature at a time point (the second time point) to start the temperature control over the battery, of temperatures representing the charging efficiency of the threshold level or more. The temperature change pattern determining device 140 may be configured to determine a temperature change pattern of the battery until the first time point, based on the power consumption pattern of the battery and the current temperature of the battery.

The temperature of the battery may be varied based on the power consumption (battery power consumption) of the battery. For example, when the battery power consumption is increased, an amount of heat emitted from the battery may be increased, and the temperature of the battery may be increased due to the increase in the amount of the emitted heat. Accordingly, the target temperature determining device 130 may be configured to determine a change pattern of the amount of the emitted heat from the battery based on the power consumption pattern of the battery. The temperature change pattern determining device 140 may be configured to determine the temperature change pattern obtained until the first time point, based on the power consumption pattern of the battery until the first time point and the current temperature of the battery.

The second time point determining device 150 may be configured to determine a second time point to start the temperature control over the battery, based on the temperature change pattern and the target battery temperature. A temperature controller 210 may be configured to start the temperature control over the battery from the second time point such that the temperature of the battery at the first time point becomes the target battery temperature.

According to an exemplary embodiment, the second time point determining device 150 may be configured to detect a time point, which is expected to represent a battery temperature most approximating to the target battery temperature, based on the temperature change pattern, and may be configured to determine the time point as the second time point. According to another exemplary embodiment, the second time point determining device 150 may be configured to determine the second time point by reflecting the performance of the temperature controller 210 to increase or decrease the temperature. The performance to increase or decrease the temperature by the temperature controller 210 may refer to performance including not only an ability to increase or decrease the temperature of the battery per unit time, but also power consumption for increasing or decreasing the temperature of the battery.

For example, the second time point determining device 150 may be configured to determine, as the second time point, a time point earlier than the time point expected to represent the battery temperature most approximating to the target battery temperature, based on the performance of the temperature controller 210 to increase or decrease the temperature, when the battery temperature fails to reach the target battery temperature even if the temperature of the battery is increased or decreased until the first time point from the time point expected to represent the battery temperature most approximating to the target battery temperature. According to another exemplary embodiment, the second time point determining device 150 may be configured to determine, as the second time point, a time point in which the temperature of the battery reaches the target battery temperature while the power consumption is minimized.

The second time point determining device 150 may be configured to reduce unnecessary power consumption for the temperature control over the battery by determining the second time point to start the temperature control over the battery. In other words, the second time point determining device 150 may be configured to determine the second time point to start the temperature control over the battery, thereby reducing the power consumption for the temperature control over the battery before the second time point.

The second section 200 may include the temperature controller 210, configured to adjust the temperature of the battery after the second time point, and the driving record collecting device 220 configured to collect the driving record of the vehicle, and generate the driving pattern information based on the driving record. Each of components included in the first section 200 may include a processor (not illustrated) and a memory (not illustrated). The processor (not illustrated) may be configure to operate each component. In addition, the memory (not illustrated) may be configured to store data for operating of each component.

The processor (not illustrated) and the memory (not illustrated) are individually included in the components (for example, the temperature controller 210 and the driving record collecting device 220). In addition, according to another exemplary embodiment, the processor (not illustrated) and the memory (not illustrated) may be included in the second section 200 to operate each component of the second section 200 and to store data for the components of the second section 200.

According to an exemplary embodiment, the second section 200 may be provided in a vehicle. As the second section 200 is provided in the vehicle, the temperature controller 210 may be configured to increase or decrease the temperature of the battery by driving thermal management devices included in the vehicle. In addition, the driving record collecting device 220 may be configured to collect driving records from the time point at which the vehicle is turned on until the time point at which the vehicle is turned off, and generate a driving pattern from the collected driving records. According to another exemplary embodiment of the present disclosure, the second section 200 may be provided in the telematics server together with the first section 100. In particular, the second section 200 may be configured to transmit data for the temperature control over the battery to the vehicle and may be configured to receive data on the driving record from the vehicle.

The temperature controller 210 may be configured to adjust the temperature of the battery. In particular, the temperature controller 210 may be configured to adjust the temperature of the battery from the second time point until the first time point to start the charging of the battery. The temperature controller 210 may include a temperature increasing device configured to increase the temperature of the battery and a temperature decreasing device configured to decrease the temperature of the battery. The temperature increasing device may include, for example, a heater, a hydrothermal heater, or a heat exchanger for heating. The temperature decreasing device may include, for example, a water-cooled cooler, an air-cooled cooler, or a radiator. The temperature increasing device and the temperature decreasing device serve as devices configured to adjust the temperature of the battery, but the present disclosure is not limited thereto.

The temperature controller 210 may include a temperature sensor configured to sense the current temperature of the battery. The temperature controller 210 may be configured to adjust the battery temperature based on the current temperature of the battery detected by the temperature sensor. When the current temperature of the battery detected by the temperature sensor is greater than the target battery temperature after the second time point, the temperature controller 210 may be configured to decrease the temperature of the battery using the temperature decreasing device. In addition, when the current temperature of the battery sensed by the temperature sensor is less than the target battery temperature, the temperature controller 210 may be configured to increase the temperature of the battery using the temperature decreasing device According to another exemplary embodiment, when the current temperature of the battery is within a preset range from the target battery temperature, the temperature controller 210 may be configured to determine whether the current time point has reached the first time point, and additionally perform the temperature control over the battery, in response to the determination result.

The temperature controller 210 may be configured to repeatedly perform the temperature control over the battery such that the temperature of the battery becomes within the preset range from the target battery temperature, before the first time point after the second time point. The driving record collecting device 220 may be configured to generate driving pattern information based on the driving record of the vehicle. As described above, the driving record of the vehicle may include all data on the driving of the vehicle from the time point at which the vehicle is turned on to the time point at which the vehicle is turned off.

The driving record collecting device 220 may be configured to collect data on the driving of the vehicle from a plurality of sensors included in the vehicle and controllers of the vehicle. For example, the vehicle may include an ultrasonic sensor configured to detect the distance between a host vehicle and another vehicle and a speed, a LIDAR sensor, and a camera. In addition, the vehicle may include a steering controller configured to adjust the direction of a vehicle, a shift controller configured to operate the transmission of the vehicle, a torque controller configured to adjust the driving torque of the vehicle, a braking controller configured to adjust the braking of the vehicle, and a body controller configured to operate electronic devices included in the vehicle. The sensors and the controllers are components generally included in the vehicle, and the details thereof will be omitted.

The driving record collecting device 220 may be configured to acquire data on the driving record, which is collected during the driving, from the sensors and the controllers, and ay generate the driving pattern information based on the driving record. The driving pattern information may be information generated by patterning a common driving record of the driving records. The driving record collecting device 220 may be configured to generate driving pattern information by analyzing the collected driving records through a process of analyzing data. The process of analyzing data may be a process based on exploratory data analysis (EDA). The driving record collecting device 220 may be configured to transmit the generated driving pattern information to the first section 100. In addition, according to an exemplary embodiment, the driving record collecting device 220 may be configured to store driving pattern information in the commercial web 20 by transmitting the driving pattern information to the commercial web 20.

Figure 2:
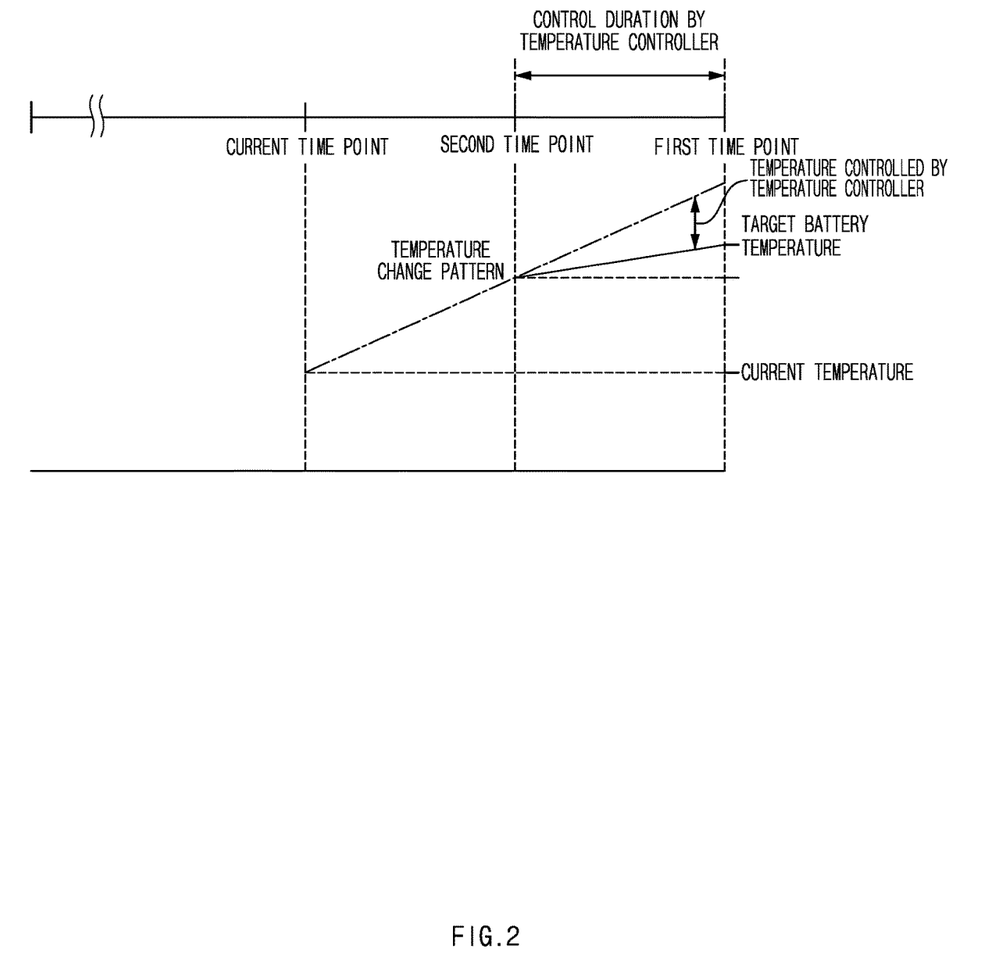
FIG. 2 is a view illustrating the change in the temperature of a battery at a first time point, and a second time point, and the temperature of the battery over the time, according to an exemplary embodiment of the present disclosure.

FIG. 2 is a view illustrating the change in the temperature of a battery at the first time point, and the second time point, and the temperature of the battery over the time, according to an exemplary embodiment of the present disclosure. FIG. 2 illustrates the current time point, the second time point, and the first time point by way of example. Since the first time point is a time in which the vehicle is stopped to start the charging of the battery, the first time point may be time after the current time point and the second time point. The second time point is a time point to start the temperature control over the battery such that the battery temperature at the first time point becomes the target battery temperature, based on the first time point. Accordingly, the second time point is time before the first time point.

FIG. 2 illustrates a temperature change pattern in which a battery temperature is increased from a preset time point until the first time point. The temperature change pattern may be determined based on the power consumption pattern and the current temperature of the battery. Accordingly, the temperature change pattern shows the change in the temperature of the battery on the assumption that the temperature is not adjusted by the temperature controller 210 (see FIG. 1).

The second time point determining device 150 may be configured to determine the second time point based on the temperature change pattern and the target battery temperature. In addition, the second time point determining device 150 (see FIG. 1) may be configured to determine the second time point by more reflecting the battery performance of the temperature controller 210 (see FIG. 1) to increase or decrease the temperature. For example, the temperature change pattern illustrated in FIG. 2 is a pattern in which the battery temperature is increased from the current temperature until the first time point. Accordingly, the second time point determining device 150 (see FIG. 1) may be configured to determine the second time point based on the performance of the temperature controller 210 (see FIG. 1) to decrease the temperature.

The performance of the temperature controller 210 of FIG. 1 to decrease the temperature may include power consumed to decrease the temperature of the battery as well as the performance to decrease the battery temperature per unit time. The second time point determining device 150 (see FIG. 1) may be configured to determine the second time point by considering the maximum number of times in which the temperature controller 210 (see FIG. 1) increases or decreases the battery temperature per time, and power consumed to increase the battery temperature.

Since the temperature controller 210 (see FIG. 1) adjusts the temperature of the battery from the second time point, the battery temperature at the first point may become the target battery temperature. When the battery temperature at the first time point becomes the target battery temperature, the charging efficiency of the battery at the first time point may be greater than or equal to the threshold level, and the battery may be rapidly charged.

Figure 3:
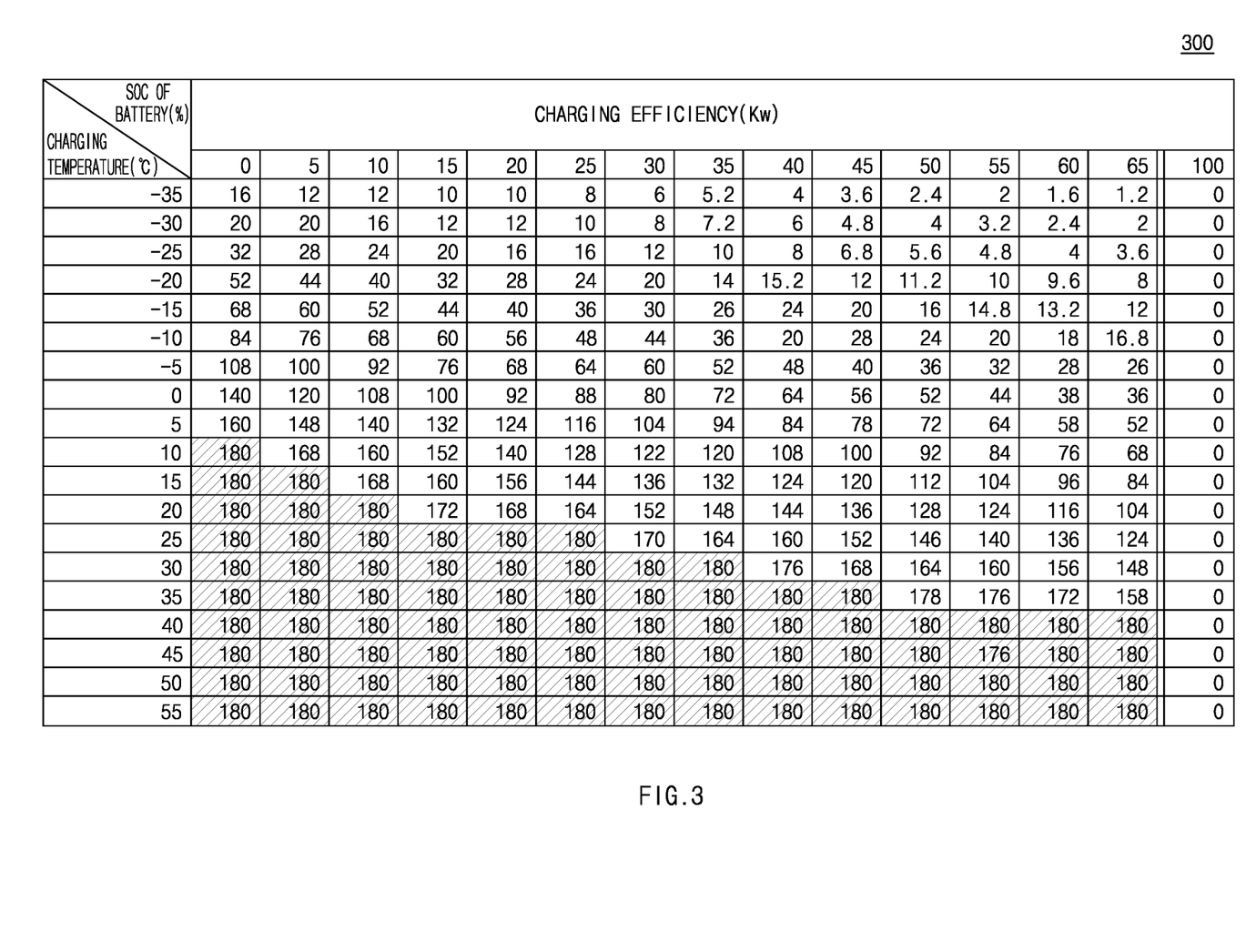
FIG. 3 is a view illustrating a charging temperature map, according to an exemplary embodiment of the present disclosure.

FIG. 3 is a view illustrating a charging temperature map, according to an exemplary embodiment of the present disclosure. FIG. 3 illustrates that an SoC of the battery, a charging temperature of the battery, and the charging efficiency of the battery are matched to each other through the charging temperature map 300. The vehicle battery may have different charging efficiencies depending on the SoC of the battery, and the charging temperature of the battery. The charging temperature map 300 may be stored in the target temperature determining device 130 illustrated in FIG. 1.

As illustrated in FIG. 3, when the SoC of the battery is in a uniform level, the charging efficiency of the battery may be increased as the charging temperature is increased. In addition, when the charging temperature of the battery is constant, the charging efficiency of the battery may be reduced as the SoC of the battery is increased. In addition, when the charging temperature is in a specific range, the charging efficiency of the battery may have the maximum value. Thereafter, even if the temperature is increased, the uniform charging efficiency may be represented.

The charging temperature map 300 illustrated through FIG. 3 is provided by way of example. For the convenience of explanation, the charging temperature is in the range of about −35° C. to 55° C., and the SoC of the battery is in the range of about 0% to 65%. The target temperature determining device 130 (see FIG. 1) may be configured to determine the target battery temperature at the first time point, based on the SoC of the battery at the first time point and a charging temperature map for the battery.

The target battery temperature is the temperature representing the charging efficiency of the threshold level or more. Accordingly, the target temperature determining device 130 (see FIG. 1) may be configured to set, to the target battery temperature, a temperature representing the maximum charging efficiency of the battery and having the minimum value in charging. For example, when the SoC of the battery is about 25% at the first time point, the temperature representing the maximum charging efficiency of about 180 kW may be in the range of about 25° C. to 55° C. In particular, the target temperature determining device 130 (see FIG. 1) may set about 25° C. as the target battery temperature.

According to another exemplary embodiment, the target temperature determining device 130 may be configured to determine, as the target battery temperature, a charging temperature, which represents the least temperature difference from a current battery temperature, of charging temperatures representing the charging efficiency of the threshold level or more. For example, when the SoC of the battery at the first time point is about 25% and the current temperature of the battery is about 42° C., the target temperature determining device 130 (see FIG. 1) may set, as the target battery temperature, about 40° C. of charging temperatures (e.g., in the range of 25° C. to 55° C.) representing the threshold value or more. The target temperature determining device 130 (see FIG. 1) may be configured to rapidly determine the target battery temperature corresponding to the SoC of the battery at the first time point, by previously storing the charging temperature map.

Figure 4:
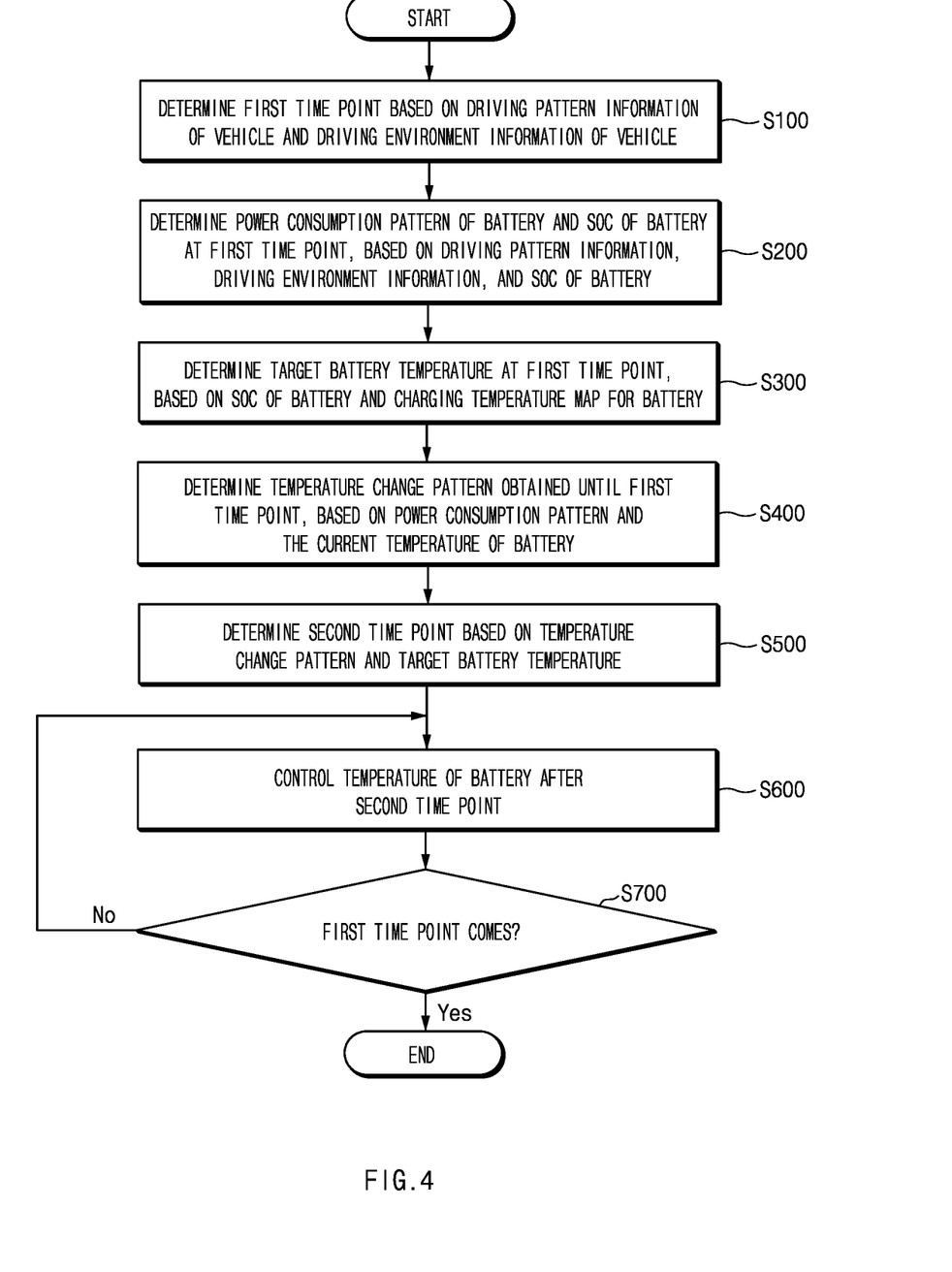
FIG. 4 is a flowchart illustrating a method for operating a device for controlling a battery for a vehicle, according to an exemplary embodiment of the present disclosure.

FIG. 4 is a flowchart illustrating a method for operating the device for controlling the battery for the vehicle, according to an exemplary embodiment of the present disclosure. The first time point determining device 110 (see FIG. 1) may be configured to determine the first time point to start the charging of the battery in the vehicle, based on the driving pattern information of the vehicle and the driving environment information of the vehicle (S100).

The driving pattern information of the vehicle may be collected through the driving record collecting device 220 (see FIG. 1) included in the second section 200 (see FIG. 1). The driving record collecting device 220 (see FIG. 1) may be provided in the vehicle, and may be configured to generate the driving pattern information based on data collected by the vehicle until the time point in which the vehicle is turned off from the time point in which the vehicle is turned on. The driving pattern information may include the power use pattern of the vehicle, an acceleration/deceleration pattern of the vehicle, and the use pattern of the controller of the vehicle.

The driving environment information of the vehicle may be information received, by the first section 100 (see FIG. 1), from the commercial web 20 (see FIG. 1). The first section 100 (see FIG. 1) may be provided in the telematics server, and may be configured to receive the driving environment information including traffic information, information on the driving path of the vehicle, information on external weather at a place in which the vehicle is driving, information on a charging station positioned on the driving path of the vehicle, a slope gradient of a driving path of the vehicle, or information on a corner angle of the driving path of the vehicle.

The first time point determining device 110 (see FIG. 1) may be configured to determine the first time point, based on the driving pattern information of the vehicle and the driving environment information of the vehicle. For example, the first time point determining device 110 (see FIG. 1) may be configured to detect a charging station, which is frequently visited by the vehicle, from the driving pattern information. The first time point determining device 110 (see FIG. 1) may be configured to determine, as the first time point, a time point to arrive at a charging station frequently visited by the vehicle, when the charging of the battery is expected, based on the driving pattern of the vehicle, at the time point at which the vehicle arrives at the charging station frequently visited.

For another example, the first time point determining device 110 may be configured to determine, as the first time point, a time point to arrive at a charging station closest to the position of the vehicle at a time point in which the SoC of the battery is less than a preset value, when the SoC of the battery in the vehicle is less than the preset value. The consumption pattern determining device 120 (see FIG. 1) may be configured to determine the power consumption pattern of the battery and an SoC of the battery at the first time point, based on the driving pattern information, the driving environment information, and the SoC of the battery (S200).

For example, the consumption pattern determining device 120 (see FIG. 1) may be configured to determine the power consumption of the battery depending on the driving pattern, based on the information on the slope gradient of the driving path of the vehicle, and the information on the corner angle of the vehicle. When the driving path has the slope rapidly inclined or has a greater corner angle, the vehicle may drive on the driving path based on the driving pattern in which the battery has greater power consumption. In addition, the consumption pattern determining device 120 (see FIG. 1) may be configured to determine the SoC of the battery at the first time point based on the current SoC of the battery and the power consumption pattern of the battery.

The target temperature determining device 130 (see FIG. 1) may be configured to determine the target battery temperature at the first time point, based on the SoC of the battery and a charging temperature map for the battery (S300). The charging temperature map may have the SoC of the battery, the charging temperature of the battery, and the charging efficiency of the battery which are matched to each other, and be stored in the target temperature determination device 130 (see FIG. 1).

When the SoC of the battery at the first time point is calculated, the target temperature determining device 130 (See FIG. 1) may be configured to determine the charging temperature corresponding to the SoC of the battery at the first time point and the charging efficiency based on the charging temperature. The charging efficiency may have a higher efficiency, at higher charging temperature and at a lower SoC of the battery.

The target battery temperature at the first time point may be a temperature representing the charging efficiency of the battery of the threshold value or more. The target temperature determining device 130 (see FIG. 1) may set, as the target battery temperature, the temperature, which represents the charging efficiency of the threshold value or more, a plurality of charging temperatures. For example, the target temperature determining device 130 (see FIG. 1) may be configured to set, as the target battery temperature, a charging temperature representing the lowest temperature of charging temperatures representing the charging efficiency of the threshold level or more.

According to another exemplary embodiment, the target temperature determining device 130 may be configured to determine the target battery temperature based on the current battery temperature, and may be configured to determine, as the target battery temperature, a charging temperature, which represents the least temperature difference from a current battery temperature, of charging temperatures representing the charging efficiency of the threshold level or more.

The temperature change pattern determining device 140 (see FIG. 1) may be configured to determine a temperature change pattern obtained until the first time point, based on the power consumption pattern and the current temperature of the battery (S400). The temperature change pattern shows a temperature change of the battery on the assumption that the temperature is not adjusted by the temperature controller 210 (see FIG. 1). The temperature change of the battery may be determined based on battery power consumption. When the battery power consumption is increased, energy to be converted into thermal energy may be increased, and the temperature of the battery may be increased. The power consumption pattern of the battery may be determined based on the driving pattern of the vehicle.

The second time point determining device 150 may be configured to determine the second time point to start the temperature control over the battery based on the temperature change pattern and the target battery temperature (S500). Since the second time point determining device 150 (see FIG. 1) determines the second time point, the power consumption of the battery caused by the temperature control over the battery before the second time point may be reduced. In addition, the battery temperature at the first time point may be adjusted to be the target battery temperature, such that the battery have the charging efficiency of the threshold value or greater at the first time point.

According to another exemplary embodiment, the second time point determining device 150 (see FIG. 1) may be configured to determine the second time point by reflecting the battery performance of the temperature controller 210 (see FIG. 1) to increase or decrease the temperature. The temperature controller 210 (see FIG. 1) may be configured to adjust the temperature of the battery after the second time point (S600). The temperature controller 210 (see FIG. 1) may include a temperature increasing device configured to increase the temperature of the battery, a temperature decreasing device configured to decrease the temperature of the battery, and a temperature sensor configured to sense the current temperature of the battery.

The temperature controller 210 (see FIG. 1) may be configured to sense the current temperature of the battery after the second time point, and may be configured to adjust the temperature of the battery until the first time point based on the sensed current temperature of the battery. A method for controlling the temperature of the battery by the temperature controller 210 (see FIG. 1) will be described in detail with reference to FIG. 5. The temperature controller 210 (see FIG. 1) may be configured to determine whether to perform the temperature control over the battery again, based on whether the current time point reaches the first time point (S700).

When the current time point does not reach the first time point ("No" in S700), the temperature controller 210 (see FIG. 1) may be configured to perform the temperature control over the battery again. When the current time point reaches the first time point ("Yes" in S700), the temperature controller 210 (see FIG. 1) may be configured to terminate the temperature control over the battery. The temperature controller 210 (see FIG. 1) may be configured to adjust the temperature of the battery such that the temperature of the battery at the first time point is within the preset range from the target battery temperature.

Figure 5:
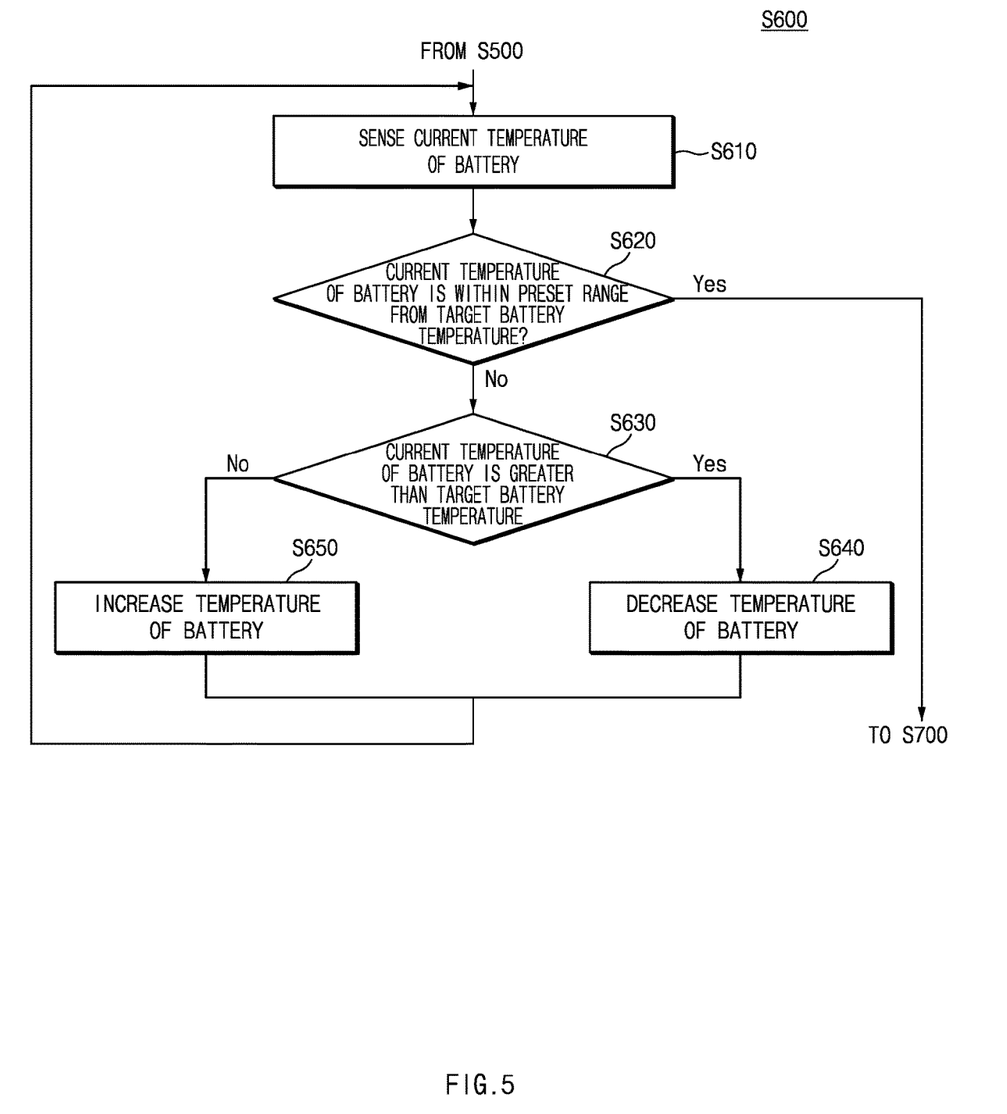
FIG. 5 is a flowchart illustrating controlling the temperature of a battery in the method for operating a device for controlling the battery for the vehicle, according to an exemplary embodiment of the present disclosure.

FIG. 5 is a flowchart illustrating controlling the battery temperature in the method for operating the device for controlling the battery for the vehicle, according to an exemplary embodiment of the present disclosure. The temperature controller 210 (see FIG. 1) may be configured to sense the current temperature of the battery using the temperature sensor (S610). The temperature controller 210 (see FIG. 1) may be configured to determine whether the current temperature of the battery is within the preset range from the target battery temperature (S620). The preset range may refer to the range which does not exert an influence on the charging efficiency of the battery.

When the current temperature of the battery is within the preset range from the target battery temperature ("Yes" in S620), the temperature controller 210 (see FIG. 1) proceeds to determining whether the current time point is the first time point. As illustrated in FIG. 4, when the current time point is the first time point, the temperature controller 210 (see FIG. 1) may be configured to perform the steps described with reference to FIG. 5.

When the current temperature of the battery is not within the preset range from the target battery temperature ("No" in S620), the temperature controller 210 (see FIG. 1) may be configured to determine whether the current temperature of the battery is greater than the target battery temperature (S630). When the current temperature of the battery is greater than the target battery temperature ("Yes" in S630), the temperature controller 210 (see FIG. 1) may be configured to decrease the battery temperature (S640).

Meanwhile, when the current temperature of the battery is less than the target battery temperature ("No" in S630), the temperature controller 210 (see FIG. 1) may be configured to increase the battery temperature (S650). The battery temperature, which is increased or decreased, may be varied based on the types and the performances of the temperature increasing device and the temperature decreasing device included in the temperature controller 210 (see FIG. 1).

According to the present disclosure, the charging time point of the battery, which is used in the hybrid vehicle and the electric vehicle, may be determined based on the driving pattern information of the vehicle and the driving environment information of the vehicle, and the status of charge of the battery may be determined at the charging time point. In addition, according to the present disclosure, the optimal temperature may be determined to charge the battery based on the status of charge of the battery at the charging time point, and the time point to start temperature control to reach the optimal temperature may be determined, thereby efficiently adjusting the temperature of the temperature.

Besides, a variety of effects directly or indirectly understood through the present disclosure may be provided. Although exemplary embodiments of the present disclosure have been described with reference to accompanying drawings, those skilled in the art should understand that various modifications are possible without departing from the technical scope of the present disclosure or without changing the subject matter of the present disclosure. Therefore those skilled in the art should understand that the technical embodiments are provided for the illustrative purpose in all aspects and the present disclosure is not limited thereto.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a battery for a vehicle, comprising:
   a first time point determining device configured to determine a first time point to start charging of the battery, based on driving pattern information of the vehicle and driving environment information of the vehicle;
a consumption pattern determining device configured to determine a power consumption pattern of the battery until the first time point, and a status of charge (SoC) at the first time point, based on the driving pattern information, the driving environment information, and a current SoC of the battery;
a target temperature determining device configured to determine a target battery temperature at the first time point, based on the SoC of the battery and a charging temperature map for the battery;
a temperature change pattern determining device configured to determine a temperature change pattern of the battery until the first time point, based on the power consumption pattern and a current temperature of the battery;
a second time point determining device configured to determine a second time point to start temperature control over the battery, based on the temperature change pattern and the target battery temperature; and
a temperature controller configured to adjust a temperature of the battery after the second time point.

2. The device of claim 1, wherein the target battery temperature is a temperature which represents battery charging efficiency of a threshold level or more.

3. The device of claim 2, wherein the target temperature determining device is configured to match the SoC of the battery, a charging temperature of the battery, and the charging efficiency to each other and store the matching result in a form of the charging temperature map.

4. The device of claim 2, wherein the temperature controller is configured to:
decrease the temperature of the battery, in response to determining that the current temperature of the battery is greater than the target battery temperature.

5. The device of claim 2, wherein the temperature controller is configured to:
increase the temperature of the battery, in response to determining that the current temperature of the battery is less than the target battery temperature.

6. The device of claim 2, wherein the temperature controller is configured to:
determine whether a current time point reaches the first time point, in response to determining that the current temperature of the battery is within a preset range from the target battery temperature; and
additionally perform the temperature control over the battery based on the determination result.

7. The device of claim 1, wherein the device for controlling the battery for the vehicle includes:
a driving record collecting device configured to generate the driving pattern information based on a driving record of the vehicle, and
wherein the driving record includes at least one of information on driving power of the vehicle, regenerative power of the vehicle, speed information of the vehicle, and operating information of a controller of the vehicle.

8. The device of claim 1, wherein the driving environment information includes at least one of traffic information, information on a driving path, an external weather condition, or information on a position of a charging station.

9. The device of claim 1, wherein the second time point determining device is configured to determine the second time point by reflecting performance of the temperature controller to increase the temperature or to decrease the temperature.

10. The device of claim 1, wherein the vehicle is a vehicle to repeatedly drive in a preset section.

11. A method for operating a device for controlling a battery for a vehicle, comprising:
determining, by a first time point determining device, a first time point to start charging of the battery, based on driving pattern information of the vehicle and driving environment information of the vehicle;
determining, by a consumption pattern determining device, a power consumption pattern of the battery until the first time point, and a status of charge (SoC) at the first time point, based on the driving pattern information, the driving environment information, and a current SoC of the battery;
determining, by a target temperature determining device, a target battery temperature at the first time point, based on the SoC of the battery and a charging temperature map for the battery;
determining, by a temperature change pattern determining device, a temperature change pattern of the battery until the first time point, based on the power consumption pattern and a current temperature of the battery;
determining, by a second time point determining device, a second time point to start temperature control over the battery, based on the temperature change pattern and the target battery temperature; and
adjusting, by a temperature controller, a temperature of the battery after the second time point.

12. The method of claim 11, wherein the target battery temperature is a temperature which represents battery charging efficiency of a threshold level or more.

13. The method of claim 12, wherein the charging temperature map has a result obtained by matching the SoC of the battery, a charging temperature of the battery, and the battery charging efficiency to each other.

14. The method of claim 12, wherein the controlling of the temperature of the battery includes:
decreasing, by the temperature controller, the temperature of the battery, in response to determining that the current temperature of the battery is greater than the target battery temperature.

15. The method of claim 12, wherein the controlling of the temperature of the battery includes:
increasing, by the temperature controller, the temperature of the battery, in response to determining that the current temperature of the battery is less than the target battery temperature.

16. The method of claim 12, wherein the controlling of the temperature of the battery includes:
determining, by the temperature controller, whether a current time point reaches the first time point, when the current temperature of the battery is within a preset range from the target battery temperature; and
additionally performing the temperature control over the battery based on the determination result.

17. The method of claim 11, further comprising:
collecting, by a driving record collecting device, the driving pattern information based on a driving record of the vehicle,
wherein the driving record includes at least one of information on driving power of the vehicle, regenerative power of the vehicle, speed information of the vehicle, or operating information of a controller of the vehicle.

18. The method of claim 11, wherein the driving environment information includes at least one of traffic information, information on a driving path, an external weather condition, and information on a position of a charging station.

19. The method of claim 11, wherein the determining of the second time point includes:
   determining, by the second time point determining device, the second time point by reflecting performance of the temperature controller to increase the temperature or to decrease the temperature.

* * * * *